Oct. 6, 1964     J. S. GOODWIN     3,151,691
ROCK BIT BEARING SEAL
Filed July 24, 1961
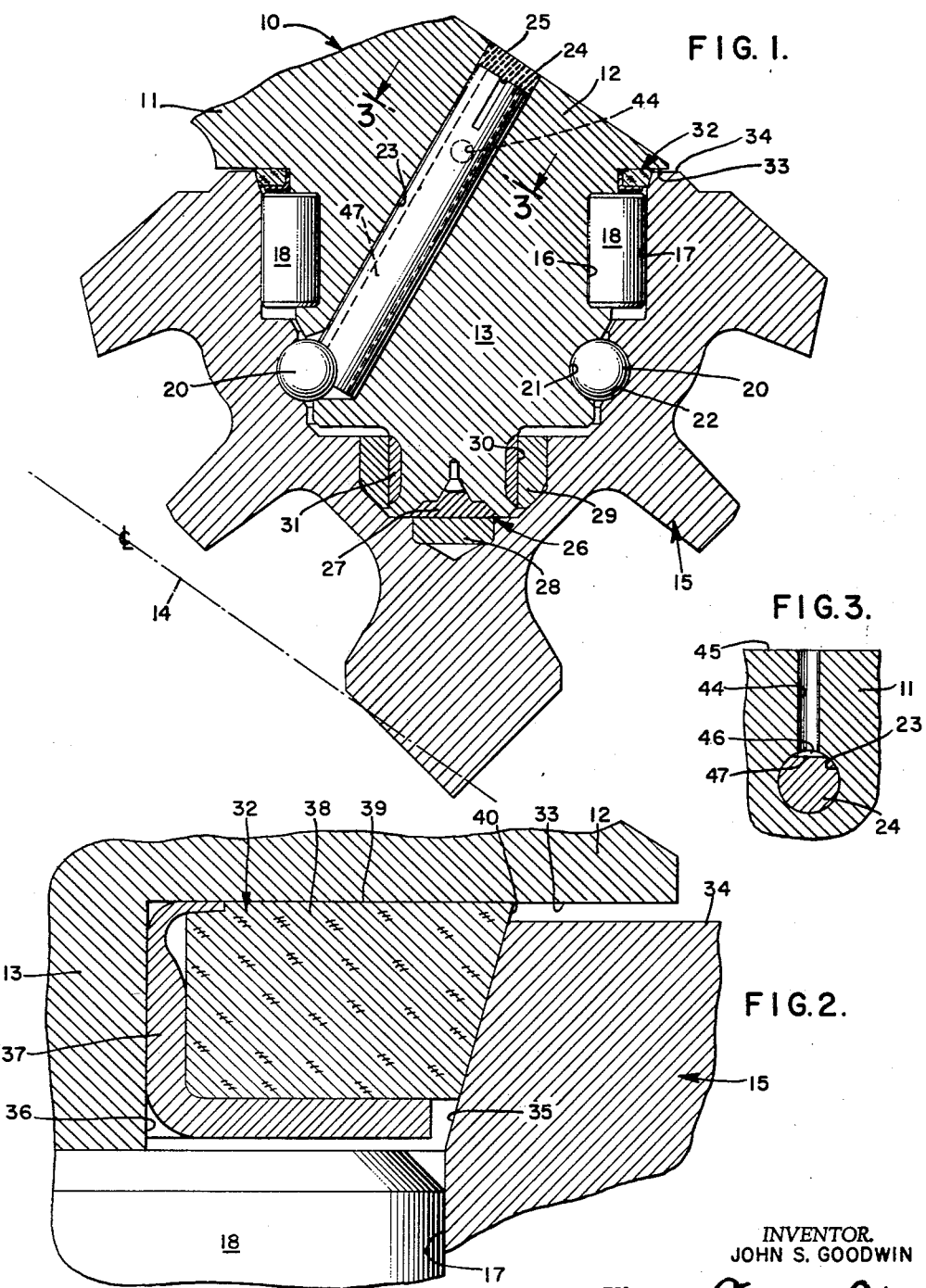
INVENTOR.
JOHN S. GOODWIN
BY
ATTORNEYS.

United States Patent Office 3,151,691
Patented Oct. 6, 1964

3,151,691
ROCK BIT BEARING SEAL
John S. Goodwin, Whittier, Calif., assignor to Globe Oil Tools Company, Los Nietos, Calif., a corporation of California
Filed July 24, 1961, Ser. No. 126,160
3 Claims. (Cl. 175—371)

This invention relates to rock bits of the general type shown in my prior Patent No. 2,960,313, granted November 15, 1960. Bits of this type are commonly provided with a body having a plurality of downward extending legs, each leg having a trunnion formed integrally therewith and extending inward. A cutter is rotatably mounted on each of the trunnions.

Since rock bits of this general type operate in a stream of mud delivered through the interior of the drill pipe to which the bit is attached there exists a problem of preventing the mud fluid from entering the bearings which support the cutters on their respective trunnions. The entrance of the mud fluid into the bearing assemblies materially shortens the service life of the bit by causing premature wear and failure of the bearings. Any increase in the service life of the bit is a very important matter because it postpones the operation of "making a round trip" to lift the bit to the surface, unjointing the drill pipe sections one by one in order to install a new bit on the end of the drill string. The bit is returned to the bottom of the hole by re-connecting the drill pipe sections end to end as the drill string and bit are returned into the hole.

In order to prolong the service life of the bit bearings, lubricant is placed within the interior of the cutter at the time it is installed on its trunnion. However, such lubricant is washed out of position by the violent action of the mud jets at the bottom of the hole.

Accordingly, it is the principal object of this invention to provide a novel form of sealing device to prevent escape of lubricant from the bearings which support the cutters on the trunnions of a rock bit. Another object is to provide a seal ring assembly which is effective to exclude mud and foreign matter from the cutter bearings as well as to retain lubricant within them. Another object is to provide a novel form of bypass to equalize pressures on opposite sides of the seal ring assembly. Other and more detailed objects will appear hereinafter.

In the drawings:

FIGURE 1 is a sectional view showing a preferred embodiment of this invention.

FIGURE 2 is a detail, partly broken away showing a portion of FIGURE 1 on an enlarged scale.

FIGURE 3 is a sectional detail taken substantially on lines 3—3 of FIGURE 1.

Referring to the drawings:

The rock bit, generally designated 10, includes a body 11 having legs 12, one of which is shown in FIGURE 1. A trunnion 13 is formed integrally on the leg and extends inward toward the axis of rotation 14 for the bit 10. A cutter 15 having an outer surface provided with teeth is rotatably mounted on the trunnion 13.

The trunnion 13 is provided with a cylindrical surface 16 forming an inner race and the cutter 15 is provided with a cylindrical surface 17 providing an outer raceway. Roller bearing elements 18 are positioned between the trunnion 13 and the cutter 15, and each contacts the inner race 16 and the outer raceway 17. A ball bearing assembly is also provided between the trunnion 13 and the cutter 15 and as shown in the drawings this includes a series of balls 20 positioned in races 21 and 22 provided on the trunnion and cutter. A passage 23 is provided in the leg 12 and trunnion 13 to permit introduction of balls 20 into the space between the raceways 21 and 22. The passage 23 is subsequently closed by the plug 24 and weld metal 25.

In addition to the roller bearings 18 and the ball bearings 20 there is provided a thrust bearing assembly 26 which includes a hard metal insert 27 bearing against a radial plate 28 provided in the cutter 15. Also a cylindrical sleeve 29 mounted in the cutter 15 engages a cylindrical surface 30 provided by a hard metal ring 31 on the trunnion.

Grease, or other suitable lubricant, is placed between the trunnion 13 and the cutter 15 at the time of assembly of the parts and in accordance with this invention a novel form of sealing assembly 32 is provided to confine the lubricant and to prevent entry of mud or foreign matter. As best shown in FIGURE 2, the leg 12 and trunnion 13 define an annular shoulder 33 at their junction. The cutter 15 is provided with an end face 34 which confronts the annular shoulder 33. The cutter 15 is provided with a flaring bore 35 which extends from the raceway 17 and intersects the end face 34.

The sealing assembly 32 includes the cylindrical outer surface 36 on the trunnion 13 and this surface 36 supports the seal ring assembly generally designated 32. This assembly 32 includes a metal retainer 37 mounted on the surface 36 and also includes a resilient seal ring 38 carried by the retainer and having a side portion 39 engaging the annular shoulder 33. The resilient sealing ring 38 is also provided with a tapered peripheral portion 40 engaging the flaring bore 35 in sealing contact.

In order to equalize pressures across the sealing assembly 32 and thus prevent damage to it when the bit 10 is lowered into the column of mud fluid in the bore hole, I provide a bypass around the sealing assembly 32. This is accomplished by means of a drilled hole 44 extending through the trailing side of the leg 11 and intersecting the passage 23, and a passage 46 formed between the flat side 47 on the plug 24 and the cylindrical wall of the passage 23. The drilled hole 44 enters the leg 11 at the trailing face 45. The passage 46 extends to the space between the inner race 21 and outer race 22. The drilled hole 44 and the passage 46 constitute the bypass, and are initially filled with grease. The grease transmits the pressure of the column of mud fluid within the well bore so as to equalize the pressure across the sealing assembly 32 as the bit 10 is lowered to the bottom of the hole.

Tests have shown that this form of sealing assembly is particularly effective in retaining lubricant within the bearing assemblies and thereby prolonging the service life of the entire rock bit and enabling it to drill more feet of hole before the bearings are worn out.

Having fully described my invention, it is to be understood that I do not wish to be limited to the details set forth herein but my invention is of the full scope of the appended claims.

I claim:

1. In a rock bit, the combination of: a body having a leg, a trunnion formed integrally with the leg and projecting inward therefrom, said leg and trunnion defining an annular shoulder at their junction, a cutter having an annular end face confronting said shoulder, bearing means rotatably mounting the cutter on said trunnion the cutter having a flaring bore intersecting said annular end face, the trunnion having a cylindrical outer surface extending axially from said shoulder and positioned within said flaring bore, a sealing assembly mounted on said cylindrical outer surface and having a resilient seal ring engaging said annular shoulder, said resilient seal ring having a tapered peripheral portion engaging said flaring bore in sealing contact, and means for equalizing the pressures on opposite sides of said seal ring.

2. In a rock bit, the combination of: a body having a leg, a trunnion formed integrally with the leg and projecting inward therefrom, said leg and trunnion defining an annular shoulder at their junction, a cutter, bearing means including rollers mounting the cutter to turn on said trunnion, said cutter having a raceway for said rollers and having an annular end face confronting said shoulder, the cutter having a flaring bore extending from one end of said raceway and intersecting said annular end face, the trunnion having a cylindrical outer surface extending axially from said shoulder and positioned within said flaring bore, a sealing assembly mounted on said cylindrical outer surface and having a resilient seal ring engaging said annular shoulder, said resilient seal ring having a tapered peripheral portion engaging said flaring bore in sealing contact.

3. In a rock bit, the combination of: a body having a leg, a trunnion formed integrally with the leg and projecting inward therefrom, a cutter having an annular end face adjacent said leg, bearing means rotatably mounting the cutter on said trunnion the cutter having a flaring bore intersecting said annular end face, the trunnion having a cylindrical outer surface extending axially from said leg and positioned within said flaring bore, a sealing assembly including a metal retainer mounted on said cylindrical outer surface and provided with a resilient seal ring, said resilient seal ring having a tapered peripheral portion engaging said flaring bore in sealing contact.

References Cited in the file of this patent

UNITED STATES PATENTS

| | | |
|---|---|---|
| 1,909,078 | Scott | May 16, 1933 |
| 2,814,465 | Green | Nov. 26, 1957 |
| 3,007,750 | Cunningham | Nov. 7, 1961 |
| 3,007,751 | Eenick | Nov. 7, 1961 |
| 3,095,934 | Goetz | July 2, 1963 |

FOREIGN PATENTS

| | | |
|---|---|---|
| 456,570 | Great Britain | Nov. 11, 1936 |